United States Patent [19]
Watanabe

[11] 4,455,047
[45] Jun. 19, 1984

[54] VEHICLE SEAT HAVING AN ADJUSTABLE FEMUR SUPPORTER

[75] Inventor: Hiroo Watanabe, Miura, Japan

[73] Assignee: Nissan Motor Co., Ltd., Yokohama, Japan

[21] Appl. No.: 272,340

[22] Filed: Jun. 10, 1981

[30] Foreign Application Priority Data

Jun. 16, 1980 [JP] Japan ............................ 55-82856[U]

[51] Int. Cl.³ .............................................. A47C 3/00
[52] U.S. Cl. .................................... 297/284; 297/224; 297/452
[58] Field of Search ............... 297/284, 224, 219, 452; 5/51 E

[56] References Cited

U.S. PATENT DOCUMENTS

| | | | |
|---|---|---|---|
| 1,426,580 | 8/1922 | Lundeen et al. | 5/51 E |
| 1,942,111 | 1/1934 | Levi | 297/224 |
| 2,183,828 | 12/1939 | Trubitz | 297/224 |
| 2,367,450 | 1/1945 | Trubitz | 297/224 |
| 4,018,477 | 4/1977 | Hogan | 297/284 |

FOREIGN PATENT DOCUMENTS

| | | | |
|---|---|---|---|
| 267348 | 12/1968 | Austria | 297/284 |
| 431008 | 6/1935 | United Kingdom | 297/224 |
| 699721 | 11/1953 | United Kingdom | 297/284 |
| 2056850 | 3/1981 | United Kingdom | 297/284 |

*Primary Examiner*—Francis K. Zugel
*Attorney, Agent, or Firm*—Schwartz, Jeffery, Schwaab, Mack, Blumenthal & Koch

[57] ABSTRACT

In order to concentrate the creases, which are inevitably produced at the front sheet member of seat proper when the front section of the seat proper takes its lowermost position by the function of the adjustable femur supporter, at an inconspicuous portion of the front sheet member, two elongate elastic members constructed of, for example, a rubber material are attached to the sheet member in a manner to be kept expanded even when the front section of the seat proper takes the lowermost position. Each elongate elastic member passes through two slots formed in the sheet member so that a portion of the elongate elastic member is located at a side opposite to another side where a major portion of elongate elastic member is located.

8 Claims, 5 Drawing Figures

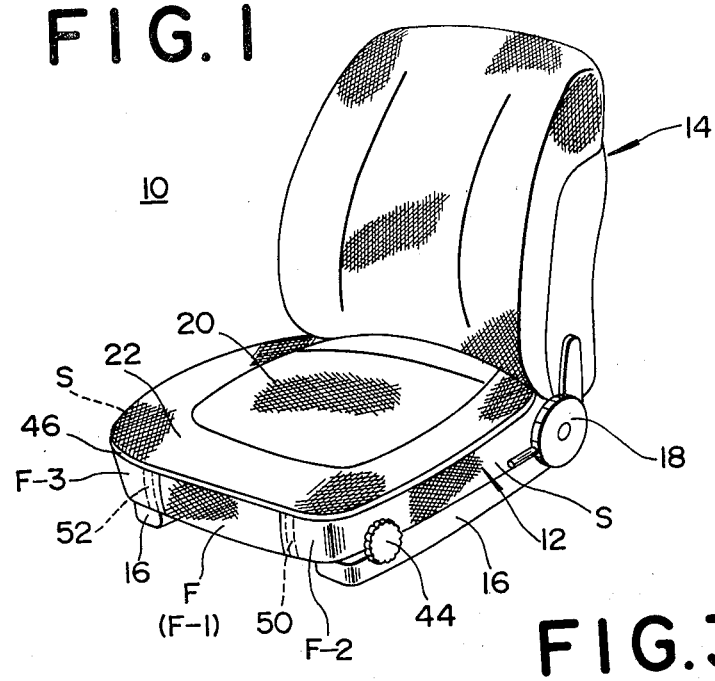
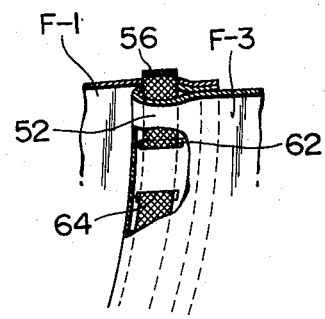
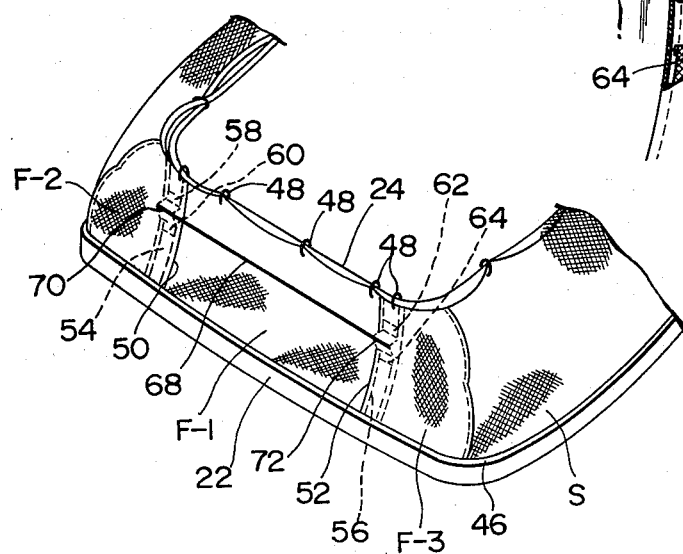

VEHICLE SEAT HAVING AN ADJUSTABLE FEMUR SUPPORTER

BACKGROUND OF THE INVENTION

1. Field of the Invention

The present invention relates in general to a seat and particularly to a vehicle seat having an adjustable femur supporter by which the front section (or femur supporting section) of the seat proper is moved up or down and adjusted to a desired position for giving the person on the seat a comfortable sitting posture. More particularly, the present invention is concerned with a seat, of a type mentioned above, which can keep good external view regardless of the position which the front section of the seat proper assumes.

2. Description of the Prior Art

In order to increase sitting comfortableness of a passenger on a seat in a vehicle, there has been proposed an adjustable femur supporter by which the front section of the seat proper is moved upward or downward to a desired position. However, some of such devices have a drawback in that when the movable front section of the seat proper takes its lowermost position, a sheet member which constitutes the front periphery cover of the front section is compelled to produce unsightly creases or crumples all over the external surface of the sheet member, which lowers the external appearance of the seat.

SUMMARY OF THE INVENTION

It is therefore an object of the present invention to provide a vehicle seat having an adjustable femur supporter, which is free of the above-mentioned drawback.

It is another object of the present invention to provide a vehicle seat an adjustable femur supporter, which has means for concentrating the inevitably produced creases of the sheet member to a position where the presence of such creases is not easily recognized by a viewer standing near the seat.

According to the present invention, there is provided a seat which comprises a seat proper having a seat cushion proper and a frame on which the seat cushion proper is mounted; a sheet member spanned between the seat cushion proper and the frame to cover the front peripheral portion of the seat proper; first means for moving the front section of the seat cushion proper up or down to a desired vertical position relative to the frame, the sheet member producing creases thereof when the front section of the seat cushion proper takes a predetermined lower position; and second means for causing the creases to be concentrated at a given limited portion of the sheet member where the presence of such creases is not easily recognized.

BRIEF DESCRIPTION OF THE DRAWINGS

Other objects and advantages of the present invention will become clear from the following description when taken in conjunction with the accompanying drawings, in which:

FIG. 1 is a perspective view of a seat according to the present invention, the seat being provided with an adjustable femur supporter;

FIG. 2 is a partial perspective view of a front section of a seat proper, the view being taken by turning over the seat proper;

FIG. 3 is an enlarged view of a part of FIG. 2;

DESCRIPTION OF THE INVENTION

Figure 4:
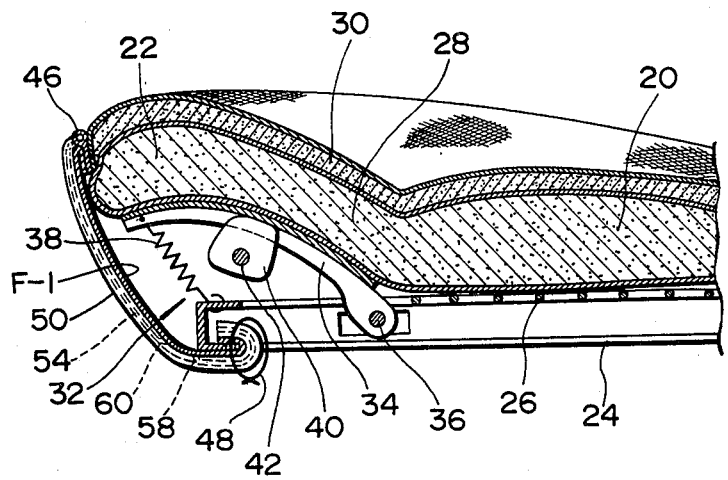
FIG. 4 is an illustration showing a condition in which the adjustable femur supporter takes its uppermost position.

Referring to FIG. 1, there is shown a seat 10 according to the present invention, which generally comprises a seat proper 12 and a seatback 14. The seat 10 is arranged on a vehicle cabin floor (not shown) through a known fore-and-aft sliding rails 16. Indicated by numeral 18 is a known tilting mechanism by which the seatback 14 is stepwisely and adjustably pivotted relative to the seat proper 12. As will become clear as the description proceeds, the seat proper 12 is constructed to have a hip supporting section 20 and a femur supporting section 22. As is seen from FIG. 4 or 5, the seat proper 12 generally comprises a frame 24 mounted on the fore-and-aft sliding rails 16 (see FIG. 1), a plurality of parallel wire springs 26 spanned between the side portions of the frame 24, an inner cushion member 28, such as a foamed polyurethane pad, lying on the wire springs 26 and an outer cushion member 30 covering the upper surface of the inner cushion member 28. The periphery of the seat proper 12 is covered with a front gusseted sheet F and side gusseted sheets S. For the reason which will become clear from the following description, the wire springs 26 are not applied to the front section of the frame 24.

Figure 5:
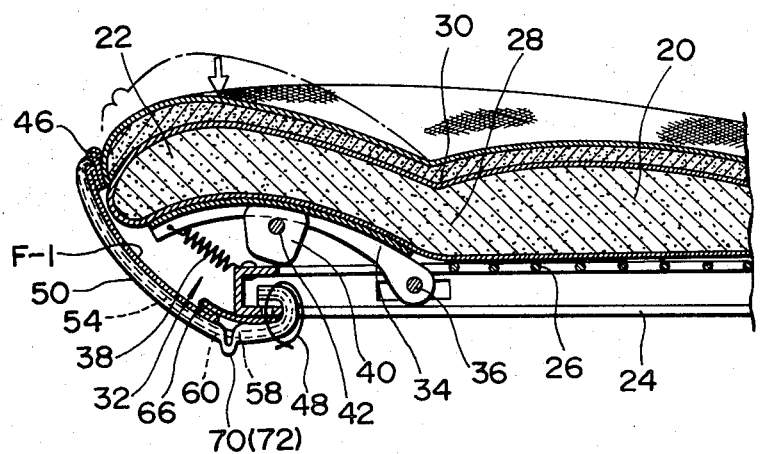
FIG. 5 is a view similar to FIG. 4, but shows a condition in which the adjustable femur supporter takes its lowermost position.

As will be seen from FIG. 4 or 5, an adjustable femur supporter 32 is arranged in the front section of the seat proper 12 where the wire springs 26 are not applied to. The adjustable femur supporter 32 comprises a curved plate 34 which is in contact with the inner cushion member 28 entirely, as shown. The curved plate 34 is pivotally connected at its lower portion to the frame 24 by means of a pivot shaft 36 which spans the frame 24 transversely. Springs 38 are arranged between the curved plate 34 and the frame 24 so that the curved plate 34 is biased to pivot counterclockwise in FIG. 4, that is in a direction toward the frame 24. A multi-faced cam 40 is disposed within a space defined between the curved plate 34 and the frame 24 and is secured to a shaft 42 which extends parallel with the pivot shaft 36. Although not well shown in the drawings, the shaft 42 of the cam 40 is rotatably held by a support member secured to the frame 24. A control knob 44 (see FIG. 1) is secured to an outwardly projecting end of the shaft 42 to be rotatable therewith about the axis thereof. As is seen from FIGS. 4 and 5, the arrangement is so made that the cam surfaces of the cam 40 selectively engage the inner surface of the curved plate 34 upon rotation of the control knob 44. The cam surfaces of the cam 40 are shaped to be progressively spaced from the rotational axis of the cam 40, so that rotation of the control knob 44 induces a stepwise upward or downward pivotting movement of the curved plate 34 about the pivot pin 36 thereby stepwisely moving upward or downward the front section 22 (or the femur support section) of the seat proper 12.

According to the present invention, the following measure is further employed to the front gusseted sheet F.

As is seen from FIGS. 1 or 4, the front gusseted sheet F is seamed at its upper section to the outer cushion member 30 through a beadwork 46 and is secured at its lower section to the frame 24 by means of clips 48. The front gusseted sheet F comprises a middle member F-1 and side members F-2 and F-3 between which the middle member F-1 is positioned. These members are seamed to one another in a manner to form two vertically extending bag portions 50 and 52 at the seamed portions of the side members F-2 and F-3, as is clear from FIG. 2. As is seen from FIG. 3, each bag portion 52 or 50 lies on the outside surface of the middle member F-1 and vertically extends along the corresponding lateral side of the middle member F-1. Elongate elastic members 54 and 56 made of, for example, a resilient rubber or the like are respectively received in the bag portions 50 and 52. Each elongate elastic member 54 or 56 is connected at its upper end, as viewed in FIG. 4, to the beadwork 46 and at its lower end to the frame 24 in a manner to be kept expanded. As is clear from FIG. 3, each side member F-2 or F-3 of the front gusseted sheet F is formed at the corresponding bag portion with two slots 58 and 60 (or 62 and 64) through which the corresponding elongate elastic member 54 or 56 passes so that a portion of the elastic member 54 or 56 contacts the lateral side of the middle member F-1. It is to be noted that the slots 58 and 60 (and 62 and 64) are positioned at the lower portions of the side members F-2 and F-3 by the reason which will become known hereinafter.

In the following, operation will be made with reference to FIGS. 4 and 5.

When the control knob 44 is turned to a given position permitting the cam 40 to engage the curved plate 34 at its highest cam surface as is shown by FIG. 4, the curved plate 34 and thus the front section 22 (or the femur support section) of the seat proper 12 take their uppermost positions so that the front gusseted sheet F is drawn tight producing no creases thereon.

When, now, the control knob 44 is turned to another position permitting the lowest cam surface of the cam 40 to engage the curved plate 34, the front section 22 of the seat proper 12 takes its lowermost position as is shown by FIG. 5. During the downward pivotal movement of the front section 22, the slots 58 and 60 (and 62 and 64) of the side members F-2 and F-3 gradually approach to each other by the contracting action of the elongate elastic members 54 and 56. With the slots 58 and 60 (and 62 and 64) approaching to each other, the middle member F-1 of the front gusseted sheet F is compelled to form an inwardly projected fold 66 which extends straight from a portion near the slots 58 and 60 to another portion near the slots 62 and 64, showing only one line 68 (see FIG. 2) at the outside surface of the middle member F-1, and simultaneously, the side members F-2 and F-3 are compelled to form respective outwardly projected folds 70 and 72 which are positioned near the slots 58 and 60 and the slots 62 and 64, respectively. Now, it should be noted that since the slots 58, 60, 62 and 64 are positioned at the lower portions of the side members F-2 and F-3, the line 68 and the folds 70 and 72 are compelled to appear or concentrated at the lower side of the front gusseted sheet F where the presence of such unsightly objects is not easily recognized by a viewer who stands near the seat 10.

In conclusion, the present invention proposes a measure by which the unsightly creases which are inevitably produced upon operation of the adjustable femur supporter are compelled to appear at an inconspicuous position thereby solving the problem encountered in the conventional seat mentioned before.

What is claimed is:

1. A seat comprising:
    a seat proper having a seat cushion proper and a frame on which said seat cushion proper is mounted;
    means for moving the front section of said seat cushion proper up or down to a desired vertical position relative to said frame;
    a sheet member having an upper section secured to said seat cushion proper and a lower section secured to said frame so that said sheet member covers the front peripheral portion of said seat proper, said sheet member spanning between said seat cushion proper and said frame in such a manner that it produces creases in said sheet member when said front section of said seat cushion proper takes a position lower than the uppermost vertical position relative to said frame; and
    means for causing said creases to be concentrated at a given limited portion of said sheet member where the presence of such creases is not easily recognized.

2. A seat as claimed in claim 1, in which said crease concentrating means comprises at least one elongate elastic member which extends between said seat cushion proper and said frame and lies on said sheet member, said elongate elastic member being kept expanded even when said front section of said seat cushion proper takes its lowermost position relative to said frame.

3. A seat as claimed in claim 2, in which said elongate elastic member is received in a vertically extending bag portion formed on said sheet member.

4. A seat as claimed in claim 3, in which said bag portion is formed with two slots through which said elongate elastic member passes so that a portion of said elongate elastic member is positioned outside of said bag portion.

5. A seat as claimed in claim 4, in which said sheet member comprises a middle member and two side members between which said middle member is positioned, said members being seamed to one another in a manner to form the vertically extending bag portion at the seamed portion of said side member.

6. A seat as claimed in claim 5, in which said bag portion of said side member lies on and vertically extends along the lateral side of said middle member, said bag portion being positioned outside with respect to said middle member.

7. A seat as claimed in claim 2, in which said elongate elastic member is constructed of a resilient rubber material.

8. A seat as claimed in claim 1, in which said front section moving means comprises a curved plate which is pivotally connected to said frame to raise the front section of said seat cushion proper when pivoted upwardly; biasing means for biasing said front section of said seat cushion proper to pivot downwardly; a multifaced cam engaging at its cam surfaces with the inner surface of said curved plate, said cam surfaces being shaped to be progressively spaced from the rotational axis of said cam; and a control knob connected through a shaft to said cam to be rotatable therewith about the axis of said cam.

* * * * *